United States Patent
Trevey et al.

(10) Patent No.: US 10,090,557 B2
(45) Date of Patent: Oct. 2, 2018

(54) SOLID-STATE MULTI-LAYER ELECTROLYTE, ELECTROCHEMICAL CELL AND BATTERY INCLUDING THE ELECTROLYTE, AND METHOD OF FORMING SAME

(71) Applicant: The Regents of the University of Colorado, a body corporate, Denver, CO (US)

(72) Inventors: James Trevey, Santa Monica, CA (US); Se-hee Lee, Louisville, CO (US); Jae-Ha Woo, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 15/065,706

(22) Filed: Mar. 9, 2016

(65) Prior Publication Data
US 2016/0261002 A1    Sep. 8, 2016

Related U.S. Application Data

(63) Continuation of application No. 13/424,017, filed on Mar. 19, 2012, now abandoned.
(Continued)

(51) Int. Cl.
| | |
|---|---|
| *H01M 10/0562* | (2010.01) |
| *H01M 4/131* | (2010.01) |
| *H01M 4/134* | (2010.01) |
| *H01M 10/0525* | (2010.01) |
| *H01M 10/0585* | (2010.01) |

(Continued)

(52) U.S. Cl.
CPC ....... *H01M 10/0562* (2013.01); *H01M 2/021* (2013.01); *H01M 2/024* (2013.01); *H01M 2/26* (2013.01); *H01M 2/30* (2013.01); *H01M 4/043* (2013.01); *H01M 4/0407* (2013.01); *H01M 4/131* (2013.01); *H01M 4/134* (2013.01); *H01M 4/1391* (2013.01); *H01M 4/382* (2013.01); *H01M 4/386* (2013.01); *H01M 4/525* (2013.01); *H01M 4/625* (2013.01); *H01M 4/628* (2013.01); *H01M 10/0525* (2013.01); *H01M 10/0585* (2013.01); *H01M 2004/021* (2013.01); *H01M 2004/027* (2013.01); *H01M 2004/028* (2013.01);
(Continued)

(58) Field of Classification Search
CPC .................................................. H01M 10/0562
See application file for complete search history.

(56) References Cited

U.S. PATENT DOCUMENTS

| | | | | |
|---|---|---|---|---|
| 2004/0219434 A1* | 11/2004 | Benson | ................ | H01M 6/187 429/304 |
| 2008/0160409 A1* | 7/2008 | Ishida | ................ | B01J 21/08 429/220 |

(Continued)

OTHER PUBLICATIONS

INada et all, Solid State Ionics 158 (2003) 275-280.*

*Primary Examiner* — Alex Usyatinsky
(74) *Attorney, Agent, or Firm* — Lathrop Gage LLP

(57) ABSTRACT

An electrochemical cell including a multi-layer solid-state electrolyte, a battery including the cell, and a method of forming the battery and cell are disclosed. The electrolyte includes a first layer that is compatible with the anode of the cell and a second layer that is compatible with the cathode of the cell. The cell exhibits improved performance compared to cells including a single-layer electrolyte.

8 Claims, 15 Drawing Sheets

Related U.S. Application Data

(60) Provisional application No. 61/453,787, filed on Mar. 17, 2011.

(51) Int. Cl.
*H01M 2/02* (2006.01)
*H01M 2/26* (2006.01)
*H01M 2/30* (2006.01)
*H01M 4/04* (2006.01)
*H01M 4/1391* (2010.01)
*H01M 4/38* (2006.01)
*H01M 4/525* (2010.01)
*H01M 4/62* (2006.01)
*H01M 4/02* (2006.01)

(52) U.S. Cl.
CPC ............. *H01M 2300/0094* (2013.01); *Y10T 29/49115* (2015.01)

(56) References Cited

U.S. PATENT DOCUMENTS

| | | | | |
|---|---|---|---|---|
| 2009/0087730 A1* | 4/2009 | Kondo | ............... | H01M 2/266 |
| | | | | 429/161 |
| 2010/0003590 A1* | 1/2010 | Park | ............... | H01M 2/1673 |
| | | | | 429/144 |
| 2010/0119947 A1* | 5/2010 | Lee | ............... | H01M 4/0471 |
| | | | | 429/231.95 |
| 2010/0285372 A1* | 11/2010 | Lee | ............... | H01M 6/185 |
| | | | | 429/320 |
| 2011/0081580 A1* | 4/2011 | Stadler | ............... | H01M 4/131 |
| | | | | 429/319 |

\* cited by examiner

SOLID-STATE MULTI-LAYER ELECTROLYTE, ELECTROCHEMICAL CELL AND BATTERY INCLUDING THE ELECTROLYTE, AND METHOD OF FORMING SAME

CROSS REFERENCE TO RELATED APPLICATIONS

This application is a continuation of and claims priority to U.S. patent application Ser. No. 13/424,017, filed on Mar. 19, 2012, which claims priority to provisional application No. 61/453,787, entitled Double Layer Construction for All-Solid-State Lithium Ion Batteries, filed on Mar. 17, 2011. Each of the foregoing disclosure(s) are hereby incorporated herein by reference to the extent the prior disclosures are not inconsistent with the present disclosure.

GOVERNMENT LICENSE RIGHTS

This invention was made with government support under grant numbers N66001-10-1-4007 and FA8650-08-01-7839 awarded by DOD/DARPA and the Air Force Research Laboratory. The government has certain rights in the invention.

FIELD OF INVENTION

The present invention relates generally to batteries and components thereof. More particularly, the invention relates to electrochemical cells including a solid-state electrolyte, to batteries including the electrochemical cells, and to methods of forming and using the batteries, electrochemical cells and components.

BACKGROUND OF THE INVENTION

Lithium-ion batteries have become increasingly popular in recent years as secondary or rechargeable batteries, because of their relatively high energy density and specific power, and their ability to hold a charge over time, compared to traditional batteries, such as lead-acid, nickel cadmium, nickel metal hydride batteries and the like. A typical lithium-ion battery includes one or more electrochemical cells, wherein each cell includes an anode (e.g., an intercalated lithium compound), a cathode (e.g., including a metal oxide) and a liquid electrolyte (e.g., a lithium salt in an organic solvent). Although such cells may work for some applications, the liquid electrolytes employed in such cells may leak from the cells and are often flammable; therefore use of such batteries can pose safety hazards.

To address the safety concerns regarding lithium-ion batteries, solid-state lithium ion cells have been developed. Unfortunately, however, solid-state cells generally have relatively low ionic conductivity through the solid electrolyte, poor rate capability, and insufficient loading of active material, compared to traditional lithium-ion cells, having a liquid electrolyte. In addition, solid-state cells often exhibit interfacial instability.

Lithium metal (e.g., lithium foil) is often avoided as anode material for solid state batteries because of the interfacial instability of lithium with the solid electrolyte material. The lithium metal tends to react with and degrade or break down the electrolyte, which causes irreversible cycling of and therefore shortened cycle life of the solid-state cells. Accordingly, improved solid-state electrochemical cells suitable for use as secondary batteries, batteries including the cells, and methods of forming the cells and batteries are desired.

SUMMARY OF THE INVENTION

The present invention generally relates to electrochemical cells, batteries including the cells, and to methods of forming the batteries and cells. More particularly, the invention relates to electrochemical cells including a multi-layer solid electrolyte, which allows for, among other things, use of lithium metal as an anode. As set forth in more detail below, the cells and batteries formed in accordance with various examples of the invention exhibit superior cycling performance and lower capacity loss, compared to similar cells and batteries including single-layer electrolytes, and allow for use of lithium as anode material and relatively high voltage electroactive cathode material.

In accordance with exemplary embodiments of the invention, a solid-state electrochemical cell includes an anode (e.g., comprising lithium), a cathode comprising electroactive cathode material (e.g., high voltage electroactive cathode material), and a multi-layer solid-state electrolyte interposed between the anode and the cathode, wherein the multi-layer solid-state electrolyte includes a first electrolyte layer that is stable (does not degrade or degrades at a relatively low rate) with respect to the anode and a second electrolyte layer that is stable with regard to the electroactive cathode material. In accordance with various aspects of these embodiments, the cathode comprises an oxide material, an electrically-conducting carbon material, and second electrolyte layer material. In accordance with further aspects, the cathode further comprises material (e.g., an oxide) overlying the electroactive cathode material to mitigate undesired reactions between the electrolyte and the cathode. The coating may be heat treated to improve cell performance. In accordance with yet further aspects of the invention, the second electrolyte layer is heat treated to increase cell performance.

In accordance with further embodiments of the invention, a method of forming an electrochemical cell includes the steps of providing an anode, providing a cathode comprising electroactive cathode material, and providing a multi-layer solid-state electrolyte between the anode and the cathode, wherein the step of providing a multi-layer solid-state electrolyte includes the steps of: preparing a first electrolyte layer composition (e.g., a composition stable with respect to the anode), preparing a second electrolyte layer composition (e.g., a composition stable with respect to the cathode active material), and forming a multi-layer electrolyte using the first electrolyte layer composition and the second electrolyte layer composition. In accordance with various aspects of these embodiments, the step of providing a cathode includes providing a composite cathode. In accordance with further aspects, the step of providing a cathode includes the steps of forming cathode active material particles and coating or covering the particles with a material that suppresses side reactions between the cathode active material and the electrolyte. Some, all, or most of the particles may be only partially coated. In accordance with various aspects, the coated cathode active material is heated (e.g., in an inert or reducing atmosphere). In accordance with yet additional aspects, the step of providing a solid-state electrolyte includes the step of ball-milling electrolyte material. And, in accordance with yet further aspects, the step of providing a solid-state electrolyte includes heat treating the second electrolyte layer composition.

In accordance with yet additional embodiments of the invention, a battery includes a housing and an electrochemical cell including an anode, a cathode, and a solid-state, multi-layer electrolyte, as described herein, between the anode and cathode. The battery may also include terminals, current collectors, and/or leads coupled to the anode and cathode, respectively.

BRIEF DESCRIPTION OF THE DRAWING FIGURES

The exemplary embodiments of the present invention will be described in connection with the appended drawing figures, in which.

Figure 3A:
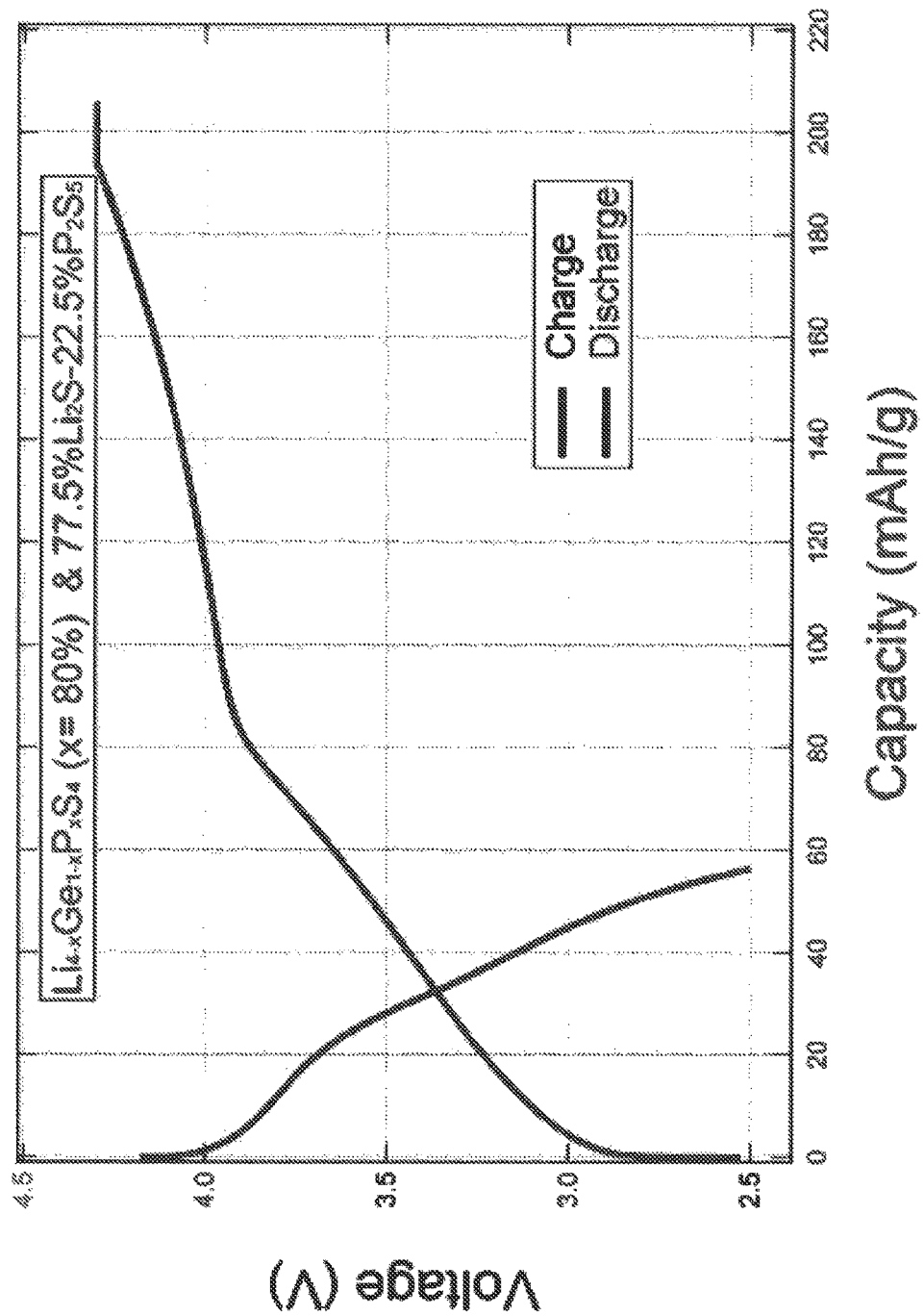
Figure 3B:
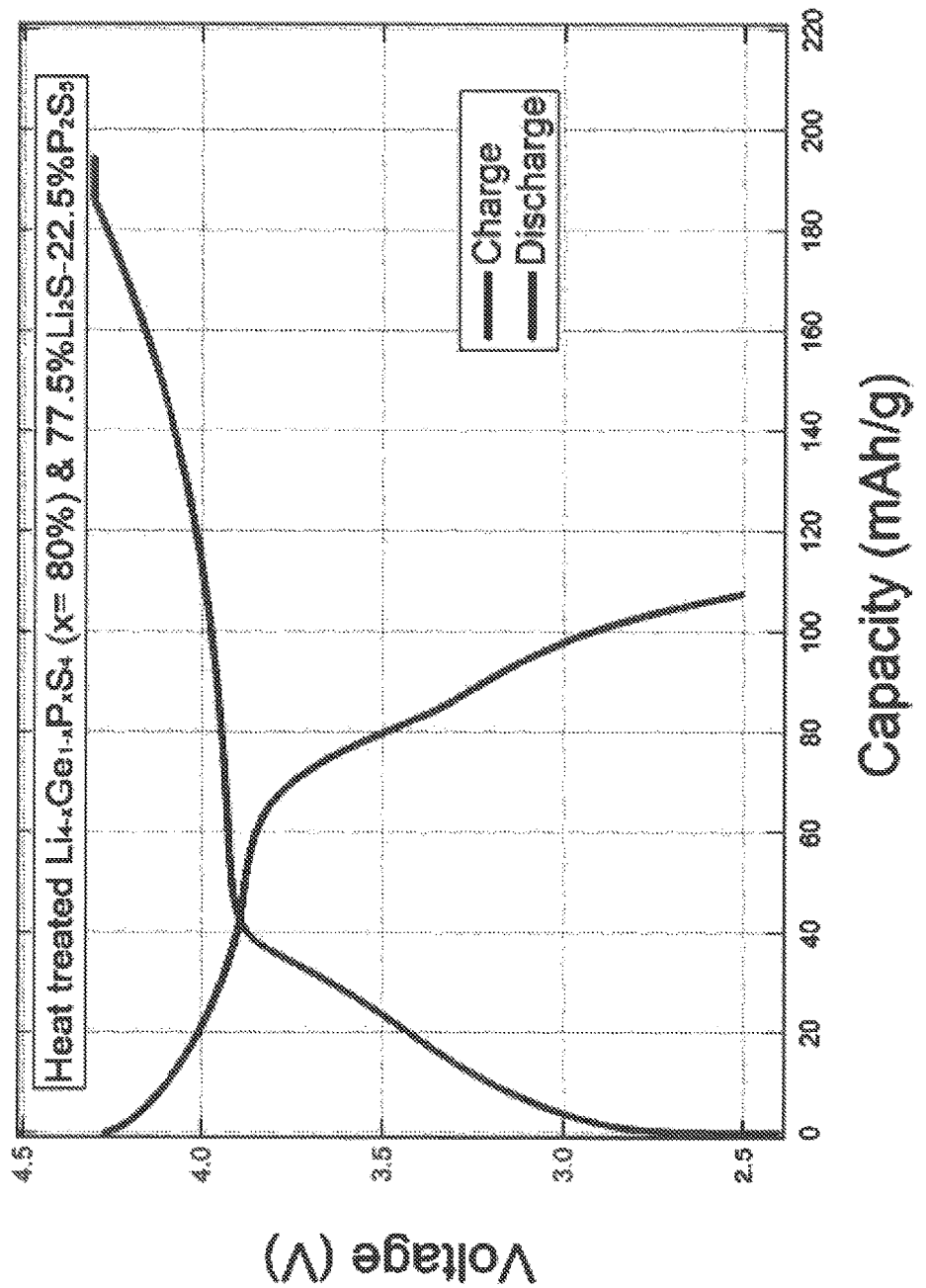
Figure 4:
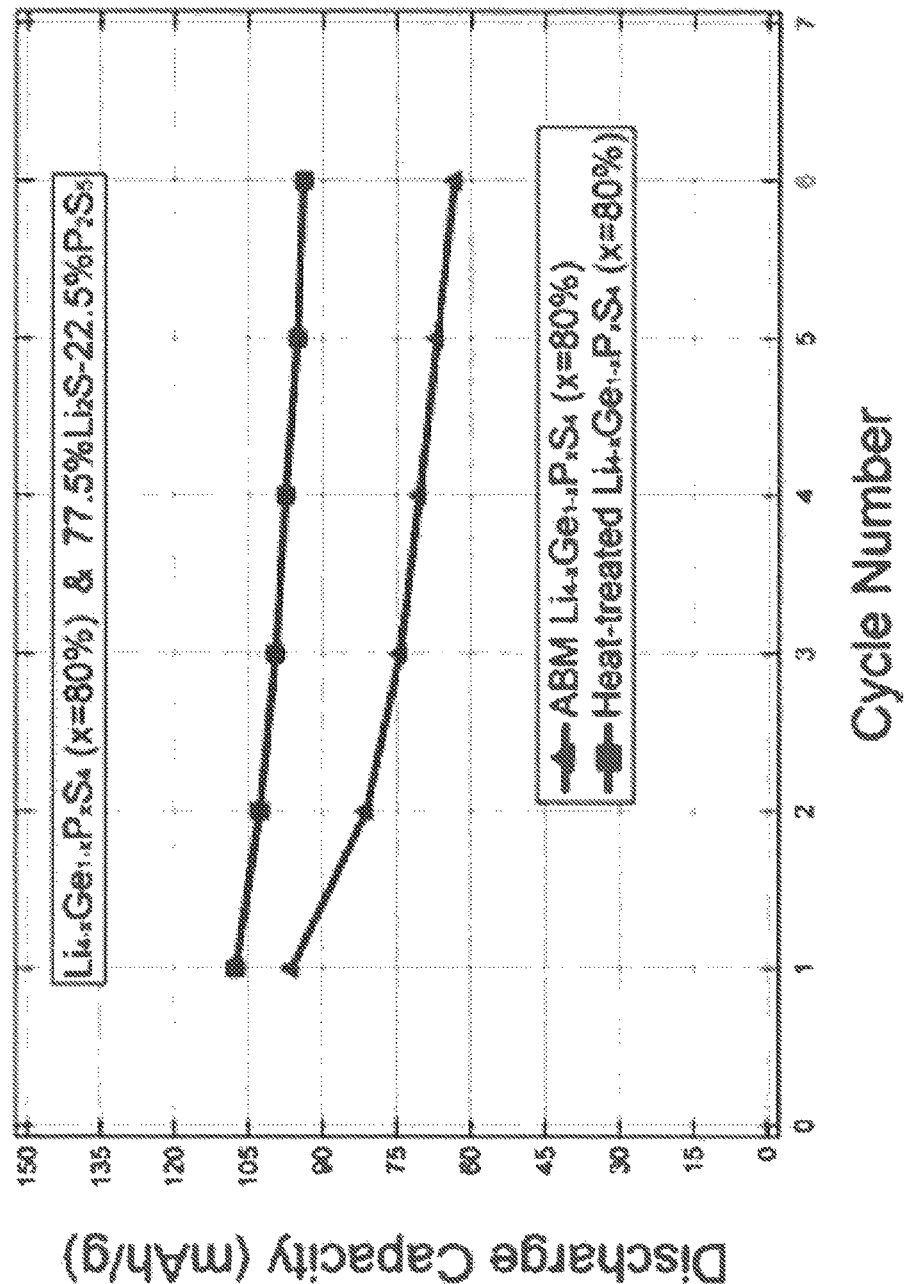
Figure 5:
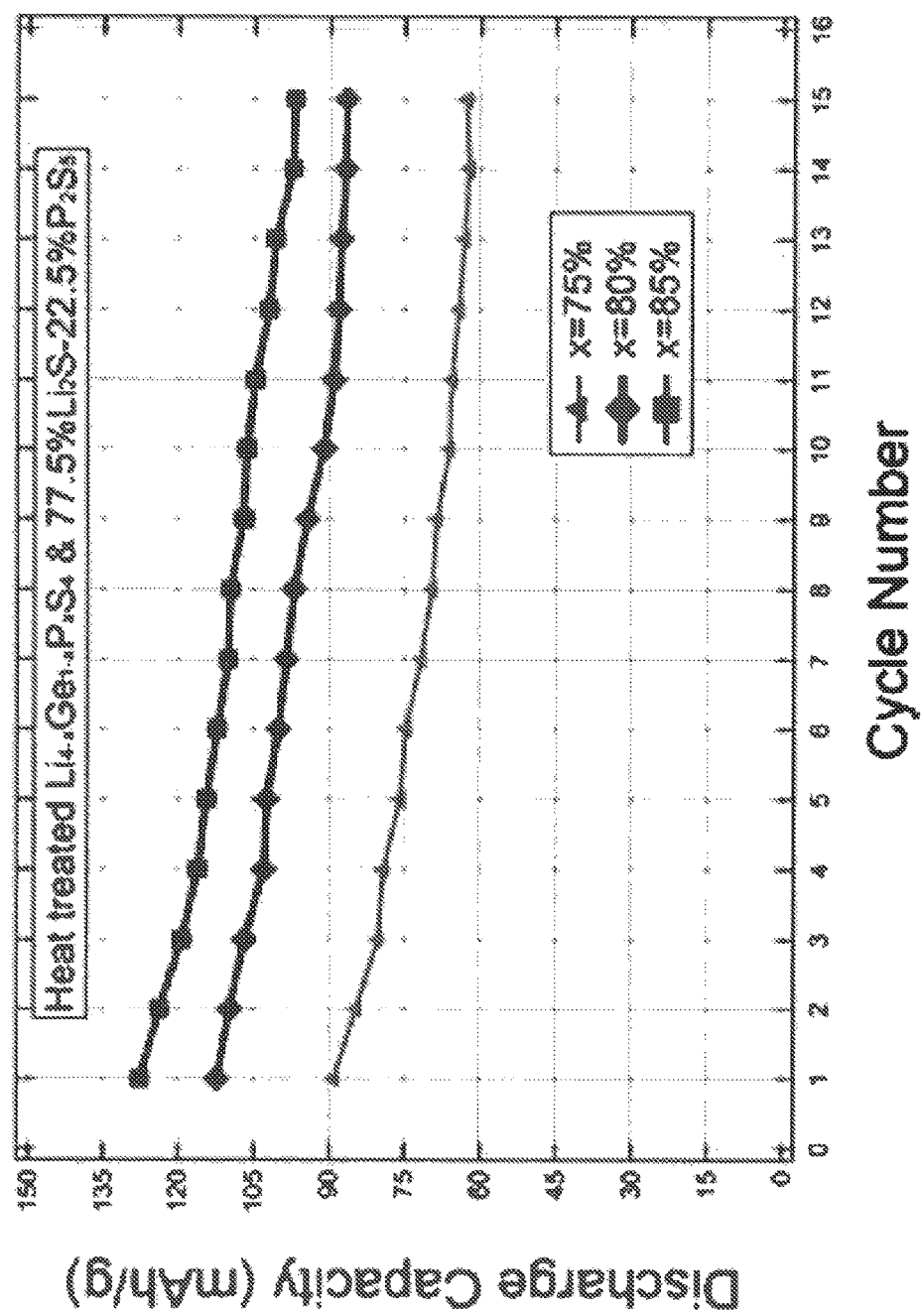
Figure 6A:
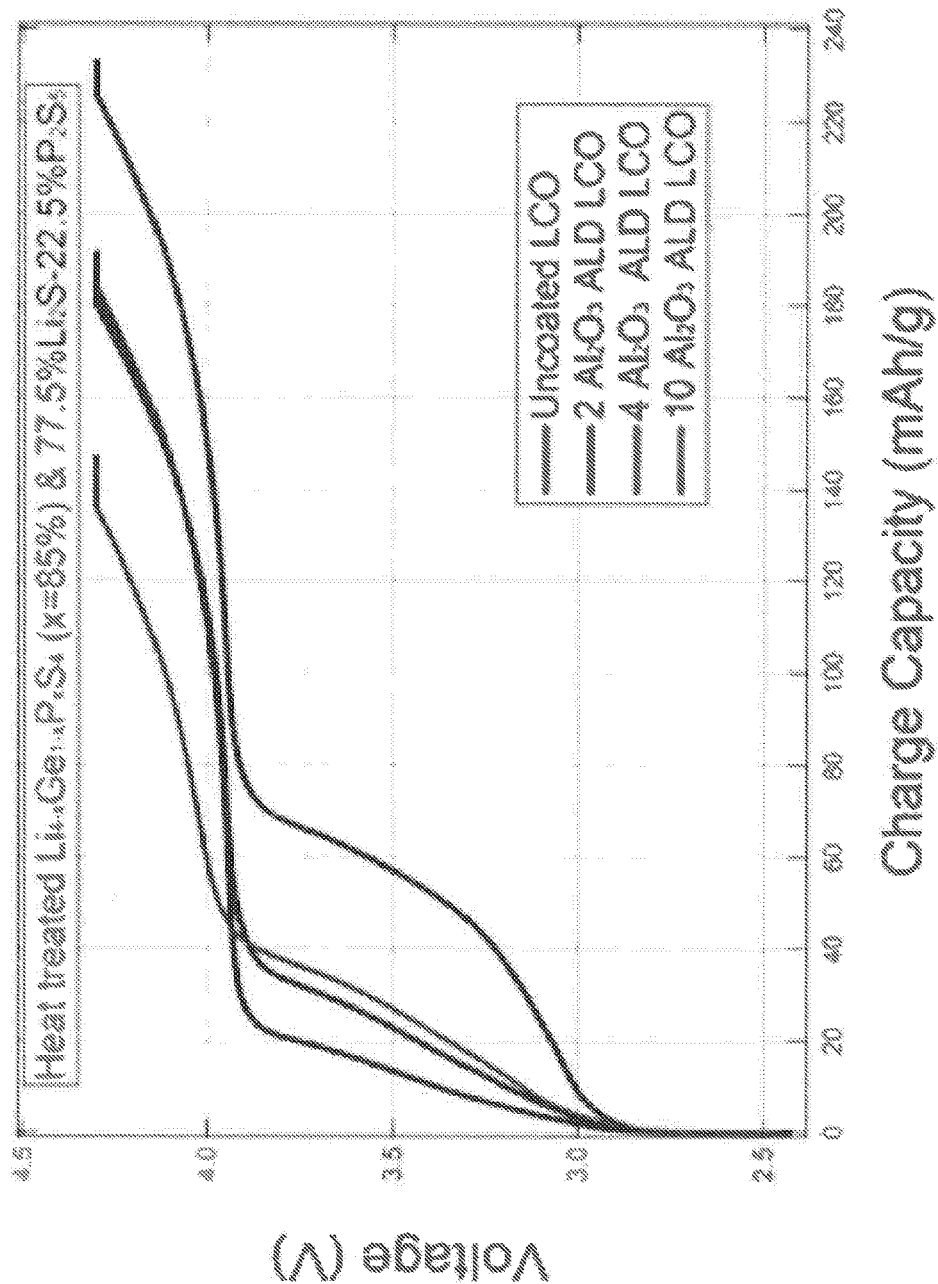
Figure 6B:
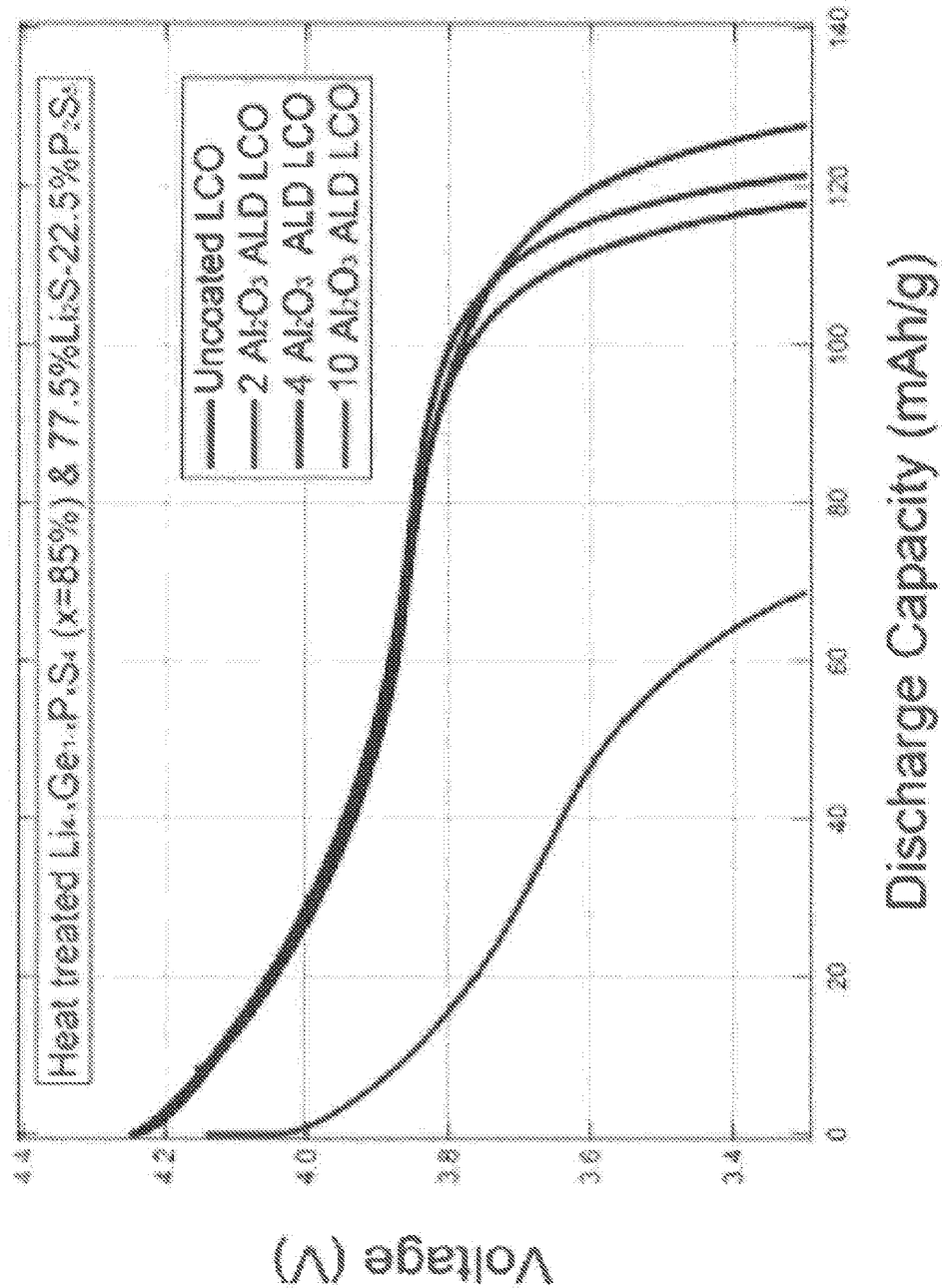
Figure 7A:
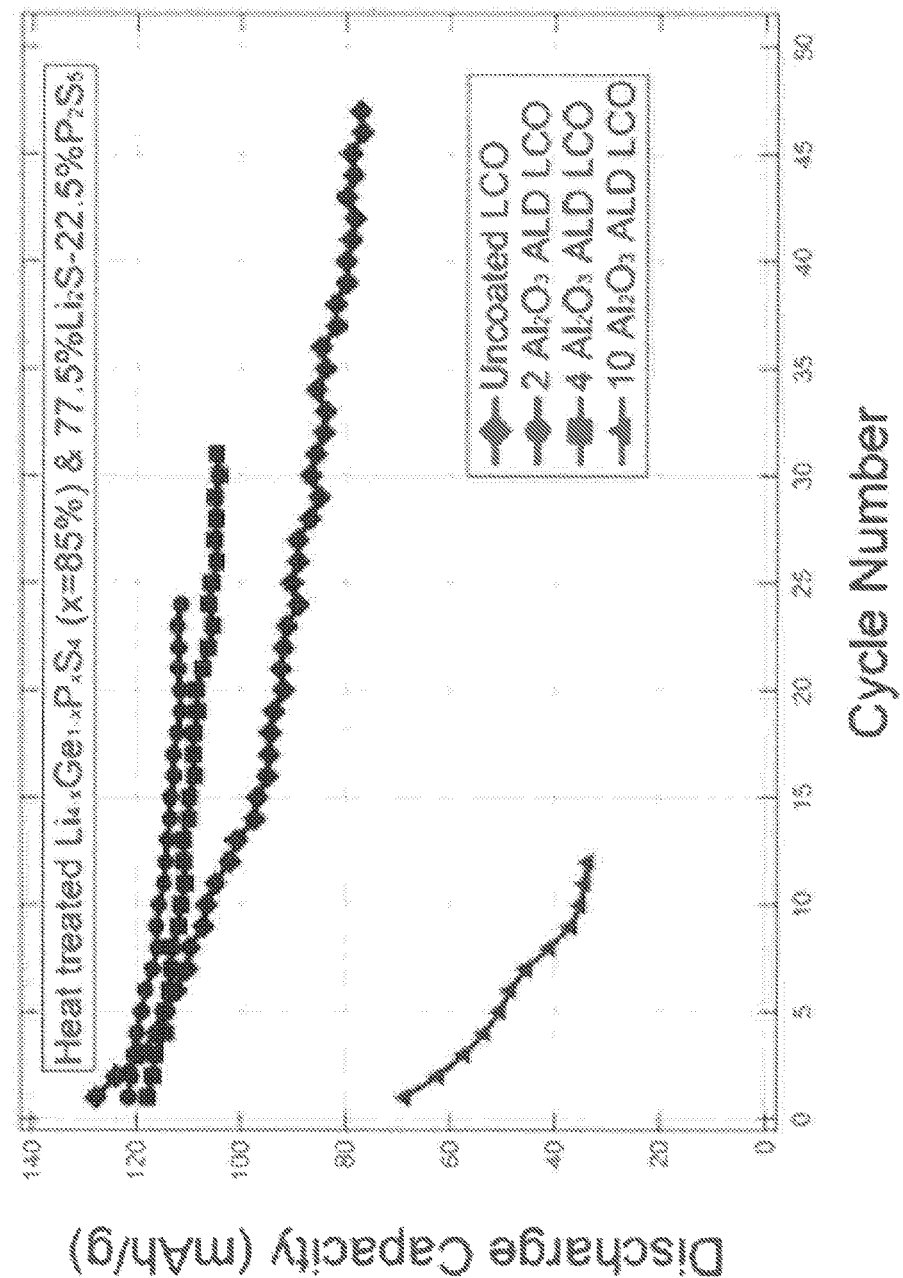
Figure 7B:
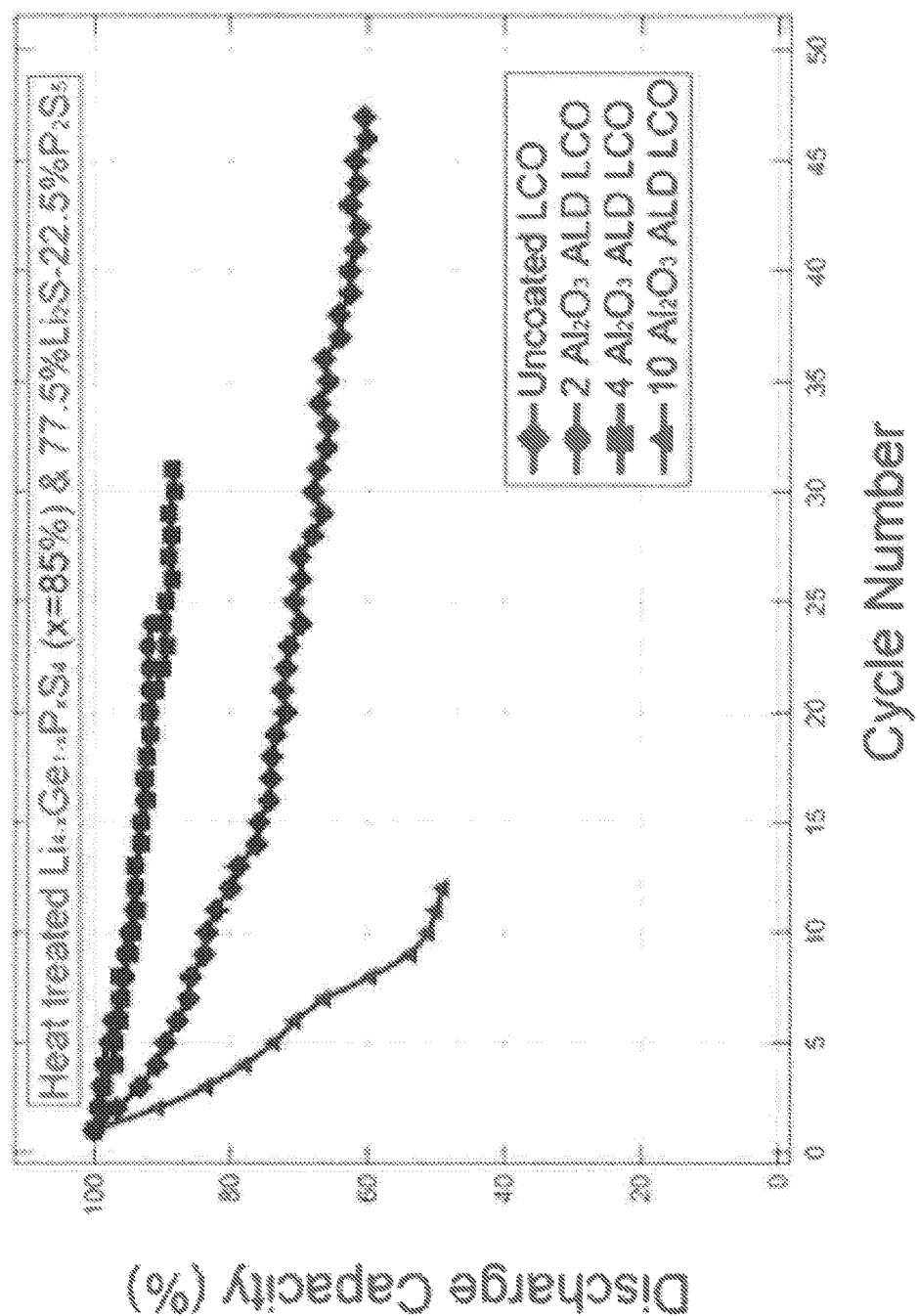
Figure 8A:
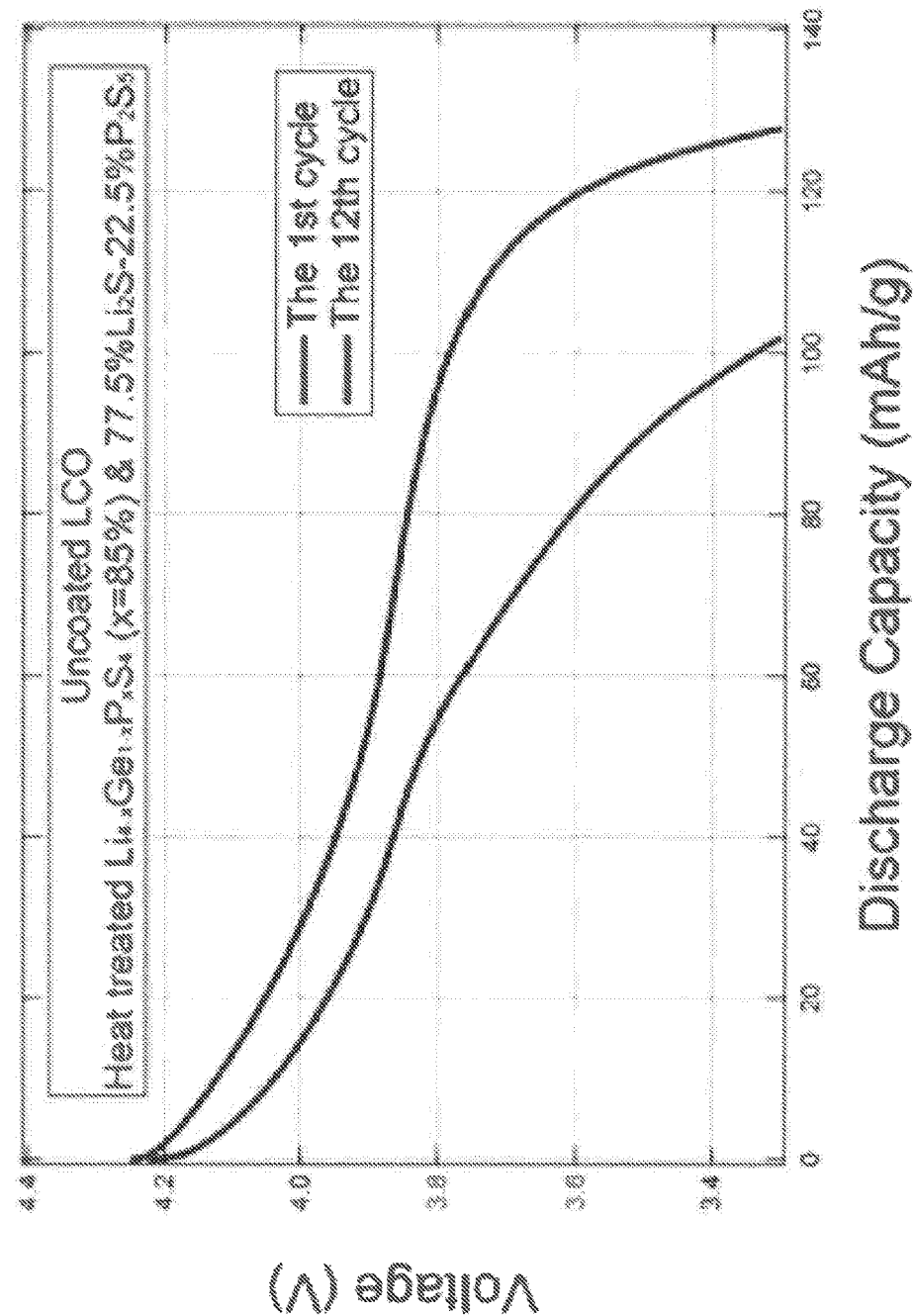
Figure 8B:
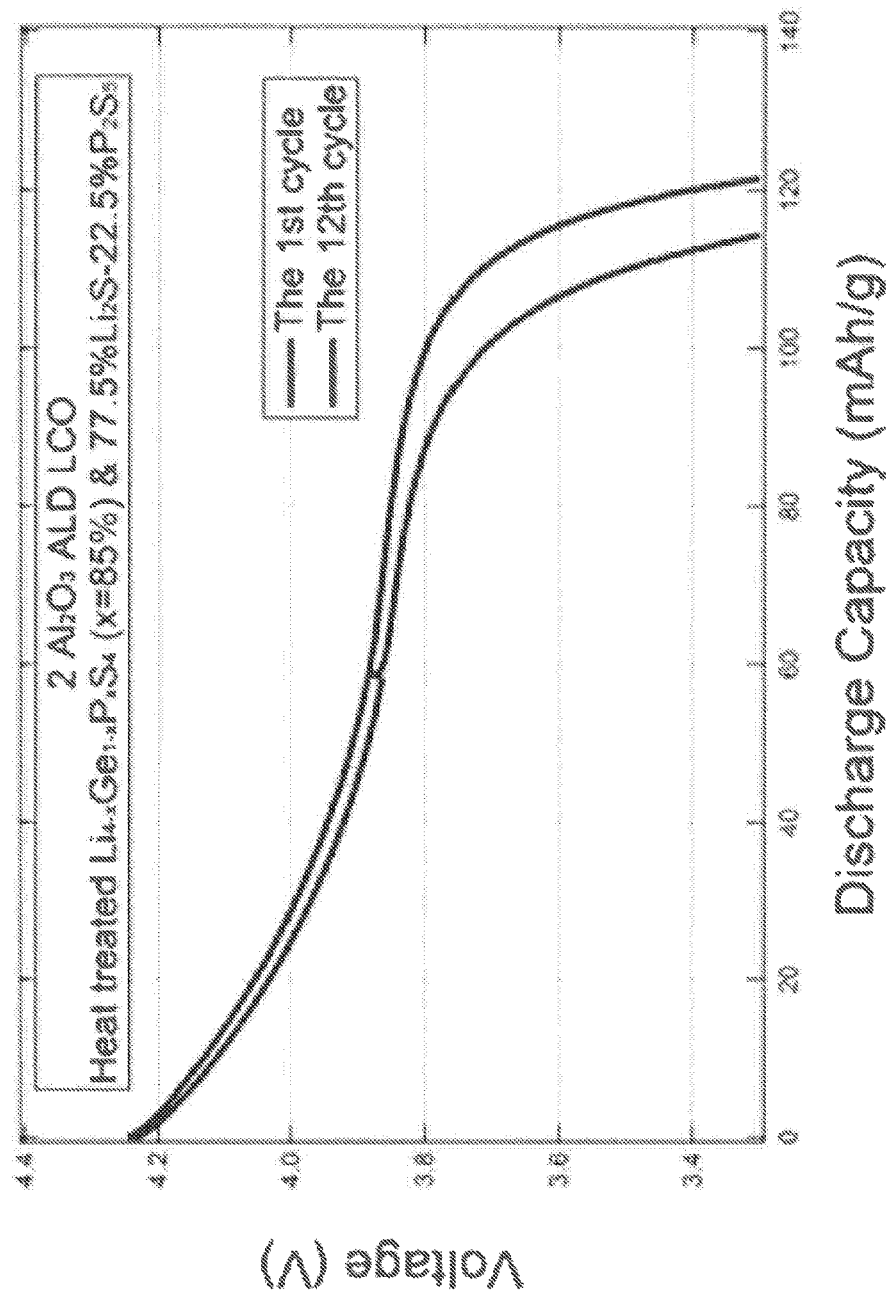
Figure 9:
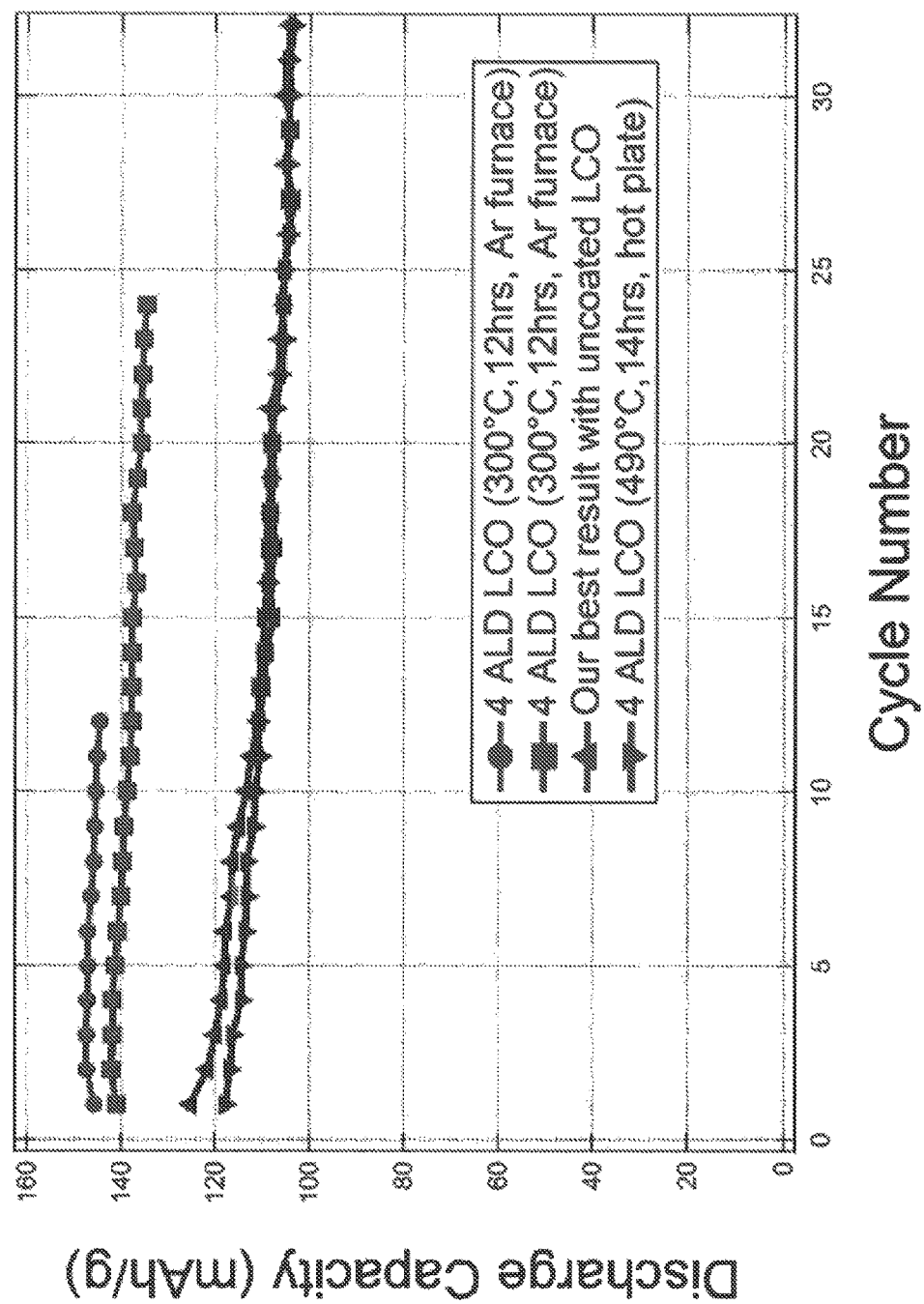
Figure 10:
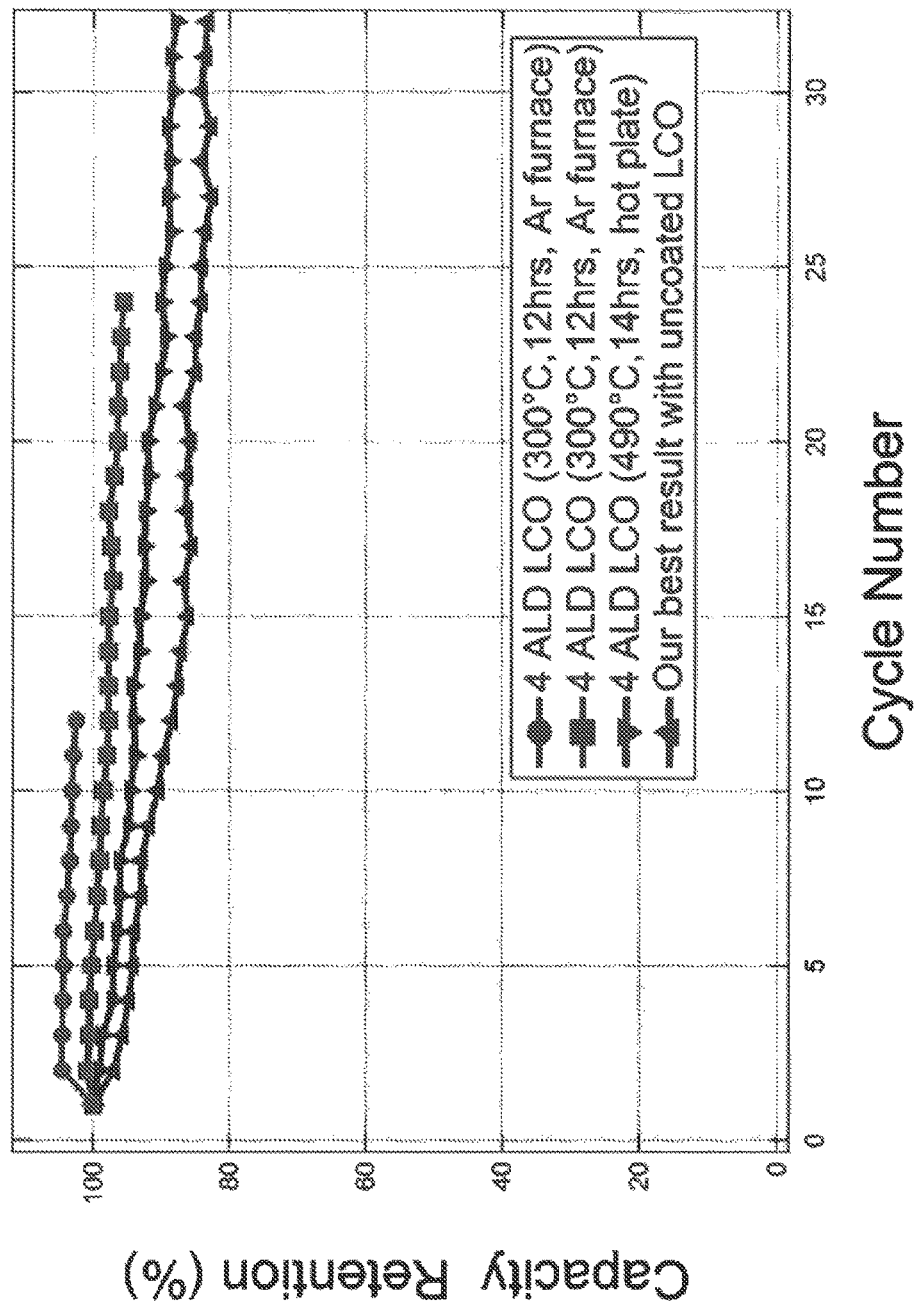
Figure 11:
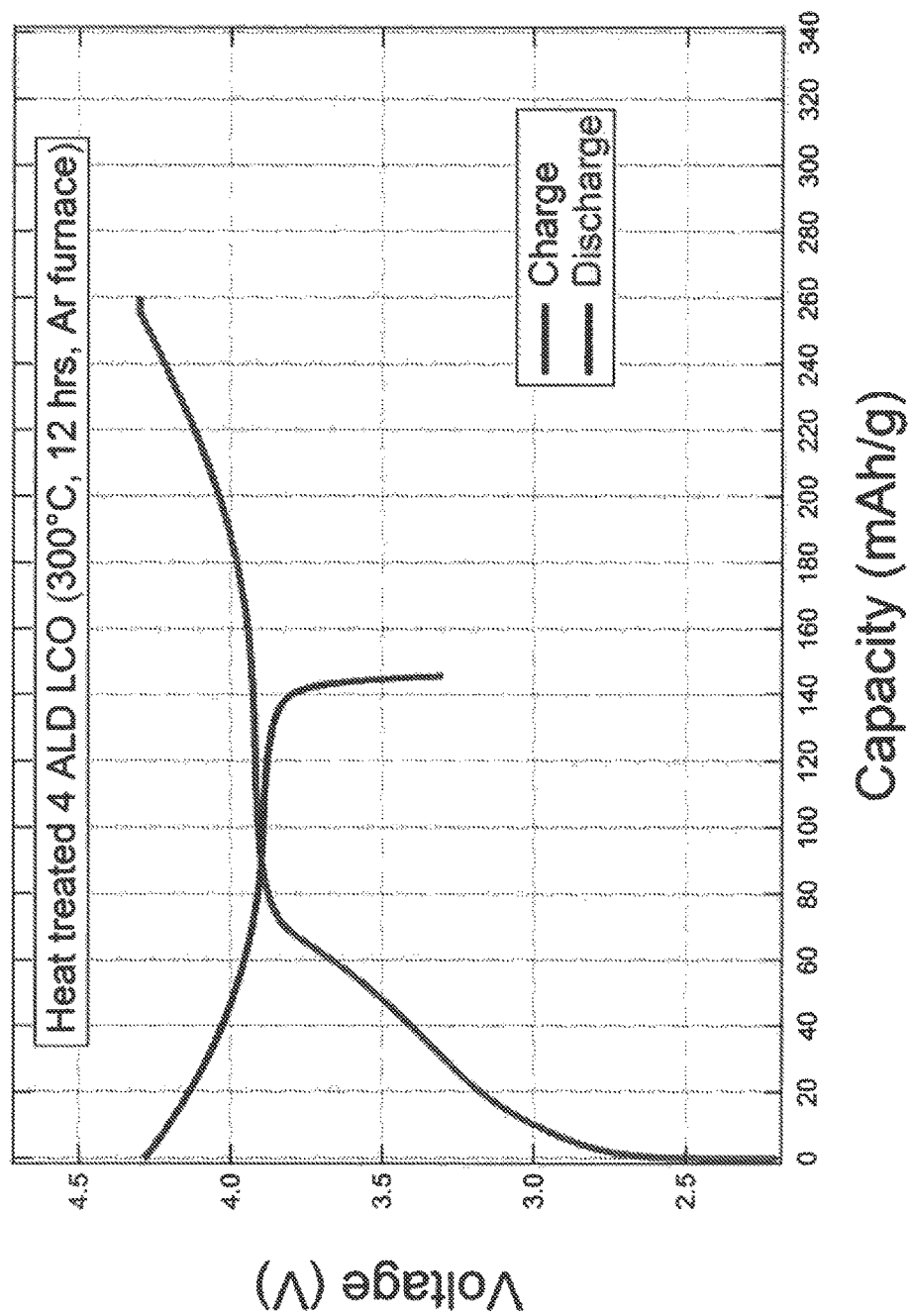

FIGS. 3(A) and 3(B) illustrate initial charge-discharge properties of cells in accordance with exemplary embodiments of the invention;

FIG. 4 illustrates cycle performance of cells in accordance with exemplary embodiments of the invention;

FIG. 5 illustrates cycle performance of cells in accordance with exemplary embodiments of the invention;

FIGS. 6(A) and 6(B) illustrate initial charge-discharge properties of cells in accordance with exemplary embodiments of the invention;

FIGS. 7(A) and 7(B) illustrate cycle performance of cells in accordance with exemplary embodiments of the invention;

FIGS. 8(A) and 8(B) illustrate discharge voltage profiles of cells in accordance with exemplary embodiments of the invention;

FIG. 9 illustrates cycle performance of cells in accordance with exemplary embodiments of the invention;

FIG. 10 illustrates cycle performance of cells in accordance with exemplary embodiments of the invention; and FIG. 11 illustrates voltage profiles of cells in accordance with exemplary embodiments of the invention.

It will be appreciated that the figures are not necessarily drawn to scale. For example, the dimensions of some of the elements in the figures may be exaggerated relative to other elements to help to improve understanding of illustrated embodiments of the present invention.

DETAILED DESCRIPTION OF PREFERRED EMBODIMENTS OF THE INVENTION

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The present disclosure provides an improved rechargeable solid-state lithium-ion electrochemical cell, a battery including the cell, and a method of forming the cell. As set forth in more detail below, the cell and battery described herein exhibit improved cycle life, improved conductivity, improved cycling performance, less capacity loss during cycling, increased initial discharge capacity, and/or other improved performance characteristics, compared to other solid-state lithium-ion cells.

Figure 1:
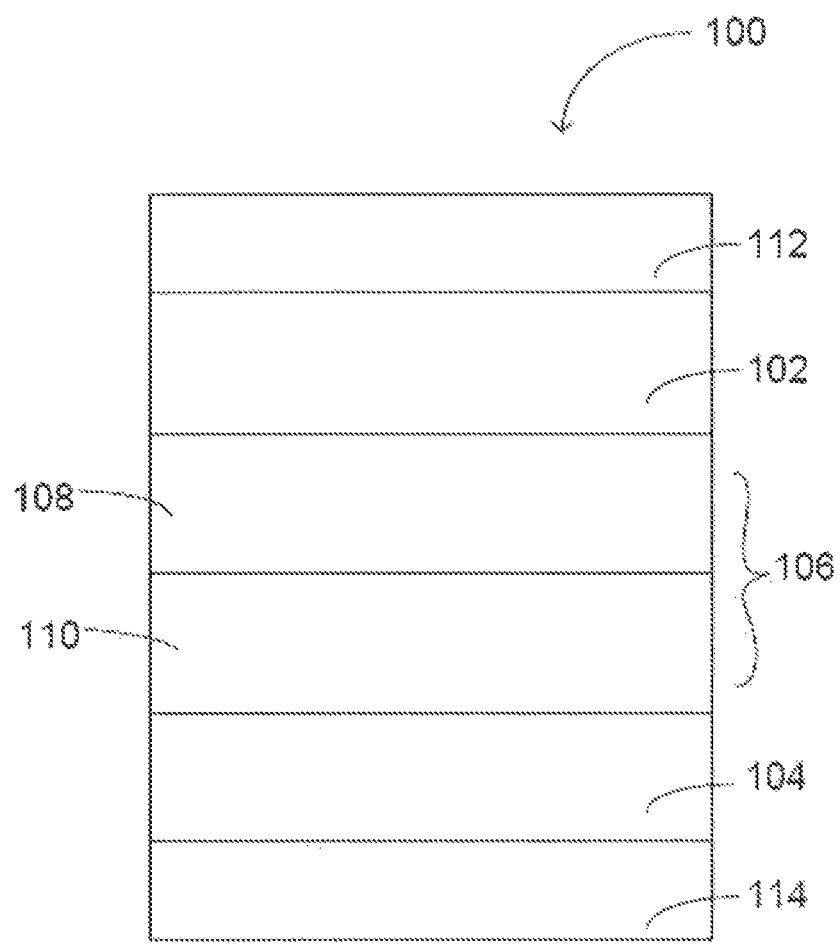
FIG. 1 illustrates an electrochemical cell including a multi-layer solid-state electrolyte in accordance with exemplary embodiments of the invention.

FIG. 1 illustrates an electrochemical cell 100, in accordance with various exemplary embodiments of the disclosure. Cell 100 includes an anode 102, a cathode 104, a multi-layer electrolyte 106 (including a first electrolyte layer 108 proximate or adjacent anode 102 and a second electrolyte layer 110 proximate or adjacent cathode 104), and optionally includes current collectors or terminals 112, 114.

Anode 102 may be formed of any suitable material. For example, anode 102 may be formed of lithium metal, indium metal, nano-silicon composite material, silicon alloys, carbon (e.g., graphite), and combinations of these materials. As set forth in more detail below, use of the multi-layer electrolyte, described below, allows for use of anodes including lithium metal, without degradation of electrolyte 106. By way of one example, anode 102 includes lithium metal foil.

Cathode 104 includes a suitable electroactive cathode material, and may include additional conductive material and electrolyte material. Suitable electroactive cathode materials include oxides, such as $LiCoO_2$, $Li_1N_{0.85}Co_{0.1}Al_{0.05}O_2$, $LiNi_{1/3}Co_{1/3}Mn_{1/3}O_2$, $LiFePO_4$, $LiMn_2O_4$, $Li4Ti5O_{12}$, and combinations of such materials. The additional conducting materials may include conducting carbon materials, such as acetylene black, carbon black, carbon nanotubes, and the like. The electrolyte material may include any of the materials described below in connection with second electrolyte layer. By way of example, cathode 104 may include about 10 to about 30 percent or about 20 percent oxide material, about 20 to about 40 or about 30 percent electrolyte material, and about 1 to about 5 or about 3 percent carbon conducting material. All percents set forth herein are in weight percent, unless otherwise indicated.

The electroactive material may be ground to a desired size to improve cell performance, such as cell capacity retention. By way of example, the electroactive material may be ground to a size of about 0.01 μm to about 20 μm, or about 1 μm to about 5 μm, or about 1 μm to about 2 μm, using, for example, a mortar and pestle.

To reduce side reactions between the electroactive cathode material and layer 110 and to improve the performance of cell 100, the cathode active material (e.g., an oxide) may be coated or covered, partially or wholly, with a suitable material—e.g., a metal oxide, such as aluminum oxide, zirconium oxide, titanium oxide, or any combinations of these materials. The coating may be conformal and may be deposited using atomic layer deposition (ALD). The thickness of the coating may vary according to desired properties of the cathode. By way of examples, the coating may be about 1, 2, 3, 4, 5, 6, 7, 8, 9, or 10 atomic layers or about 0.2 nm to about 5 nm thick. Layers thicker than 10 atomic layers or even 8 or 6 atomic layers may reduce some performance characteristics of cell 100.

To improve the conductivity of the coated electroactive material, the coated material may be heat treated. For example, the material may be exposed to temperature of about 250° C. to about 600° C. for about 1 to about 24 hours in a reducing or inert atmosphere, such as in an argon, nitrogen, or hydrogen gas environment.

Solid-State, multi-layer electrolyte 106, in accordance with various exemplary embodiments of the disclosure, is configured to improve performance of cell 100 because of reduced degradation of electrolyte 106 during operation or cycling of cell 100, compared to traditional solid electrolyte materials. Multi-layer electrolyte 106 includes first electrolyte layer 108, which is relatively stable with respect to anode 102 material and second electrolyte layer 110, which is relatively stable with respect to cathode 104 material.

To increase ionic conductivity of electrolyte 106 and increase interfacial contact between the electrolyte layers and the respective electrodes, layer 108 and/or layer 110 may be formed using melt quenching and/or ball milling techniques. In accordance with various exemplary embodiments of the invention, layer 108 and/or layer 110 is formed using ball milling to produce an average particle size of about 0.5 μm to about 20 μm, or about 0.5 μm to about 10 μm, or about 1 μm to about 5 μm.

Layer 108 may include $xLi_2S(1-x)P_2S_5$, where x is a molar ratio and ranges from about 60 to about 80. By way of example, layer 108 may include 77.5 $Li_2S(1-x)P_2S_5$. 22.5 $Li_2S(1-x)P_2S_5$ is relatively stable with respect to various materials suitable for anode 102, such as lithium. Layer 108 material may be formed by ball milling $xLi_2S(1-x)P_2S_5$ material to a desired particle size.

Layer 110 may include $Li_xGe_yP_zS_4$, where x, y, z are mole concentrations, which range from 2.3<x<4, 0<y<1, and 0<z<1. Layer 110 material may be formed by, e.g., ball milling with or without heat treatment. For example, material for layer 110 may be formed by mixing reagent grade $Li_2S$, $P_2S_5$, and $GeS_2$ in desired weight rations and grinding the mixture using a planetary ball mixer. The mixture may then be heat treated in an inert or reducing atmosphere to obtain desired properties. Additionally or alternatively, the electrolyte material may be ball milled and heat treated in the same step. For example, a high energy ball milling (e.g., planetary ball milling) in an argon environment at elevated temperatures can be used to form the electrolyte material. The resulting material may subsequently be exposed to additional heat treatment in a reducing environment. In accordance with specific examples, layer 110 material may be heated from about 300° C. to about 550° C. for about 1 to about 24 hours in a reducing atmosphere, such as an atmosphere including one or more of argon, nitrogen, or hydrogen.

Terminals 112, 114 may be formed of any suitable conductive material, such as metal. By way of particular example, terminals 112 and 113 are formed of titanium.

Batteries, in accordance with various exemplary embodiments of the invention, include one or more cells as described herein, current collectors (e.g., collectors 112, 114), leads or terminals (e.g., a positive lead and a negative lead) electrically coupled to the collectors, and a casing or housing, which encapsulates at least a portion of the cell.

Specific Examples

The following non-limiting examples illustrate exemplary cells in accordance with various embodiments of the disclosure. These examples are merely illustrative, and it is not intended that the invention be limited to the examples. Compositions of various cell components in accordance with the present invention may include the compounds and materials listed below as well as additional and/or alternative materials, and various layers and materials described below may be interchanged with similar materials and layers described in connection with other cells.

To form layer 110 material, $Li_{4-x}Ge_{1-x}P_xS_4$ (x mol %) material was synthesized by planetary ball milling (PBM) with/without heat treatment. Reagent-grade powders of $Li_2S$ (Aldrich, 99.999%), $P_2S_5$ (Aldrich, 99%), and $GeS_2$ (City Chemical LLC., 99.99%) were mixed with various weight ratios in a stainless steel jar (MTI Corporation) at a net weight of 2 g with 24 stainless steel balls (10 mm in diameter) for grinding. The mixture was under planetary ball milling (500 rpm, 20 continuous hours) using a High Speed Shimmy Ball Mill SFM-1 (MTI Corporation). Heat treatment for as-ball-milled (ABM) electrolyte material powders was performed. The $Li_{4-x}Ge_{1-x}P_xS_4$ material was placed on the hot plate for the heat treatment to designated temperature at approximately 10° C. min$^{-1}$. After reaching the designated temperature, the electrolyte material was placed under the isothermal condition for a desired amount of time and then removed from the hot plate for air cooling.

To form cathode 104 material, $LiCoO_2$ powder (Sigma-Aldrich), $Li_{4-x}Ge_{1-x}P_xS_4$ SSE, and acetylene black (Alfa-Aesar, 50% compressed) at weight ratio of about 20:30:3 were mixed and ground with a mortar with pestle.

Multi-layer electrolyte 106 was constructed by the method described below. First, a pellet of 77.5 $Li_2S$-22.5$P_2S_5$ was made by hand-pressing 100 mg of 77.5 $Li_2S$-22.5$P_2S_5$ prepared by the planetary ball milling method. 100 mg of $Li_{4-x}Ge_{1-x}P_xS_4$ was hand-pressed on the top of 77.5 $Li_2S$-22.5$P_2S_5$ pellet and pelletized by cold-pressing (1 metric tons) to form the multi-layer electrolyte.

To form a cell, 10 mg of the composite electrode material was evenly spread on the top of $Li_{4-x}Ge_{1-x}P_xS_4$ layer and pelletized by cold-pressing (5 metric tons) for 5 min. Li foil (Alfa-Aesar, 0.75 mm thick) was attached to 77.5 $Li_2S$-22.5$P_2S_5$ (mol %) layer 108 by a pressure at 2 metric tons, using cold-pressing method. All pressings were done in a polyaryletheretherketone (PEEK) molds (φ=1.3 cm) with Ti metal rods.

Cell fabrication and experiments were performed in an argon-filled glove box. Galvanostatic charge-discharge cycle performance tests were carried out at room temperature using Arbin BT2000 (Arbin INSTRUMENTS).

Figure 2:
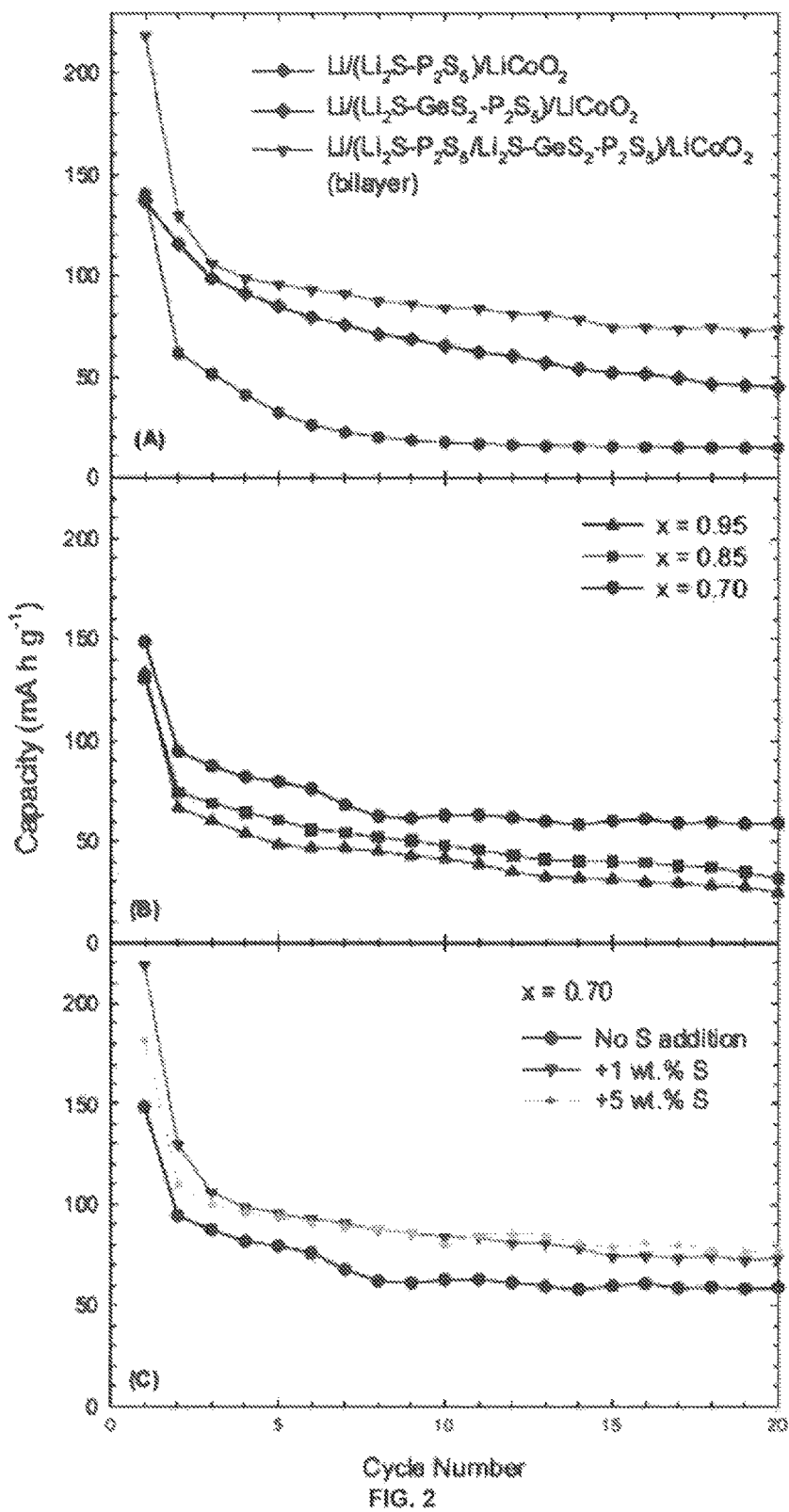
FIG. 2 illustrates charge capacity as a function of cycle number of cell in accordance with exemplary embodiments of the invention.

FIG. 2 part (A) illustrates cell charge capacity as a function of cycle number for cells formed according to example 1, compared to cells including a single layer electrolyte of either 77.5 $Li_2S$-22.5$P_2S_5$ or $Li_2S$—$GeS_2$—$P_2S_5$. As illustrated in FIG. 2(A), cells including multi-layer solid-state electrolyte have improved capacity (as a function of cycles), compared to single-layer electrolytes, which is thought to be as a result of the stable interfaces between the electrodes and the adjacent electrolyte layers. In one context, an electrolyte layer being stable relative to an anode or cathode means that the layer breaks down at a lower rate with respect to an adjacent electrode relative to the other electrode.

FIG. 2 part (B) illustrates the effects of manipulating x in $Li_{4-x}Ge_{1-x}P_xS_4$. The addition of $GeS_2$ in the $Li_2S$—$P_xS_5$ system is thought to enhance the stability of the of the cathode active material/electrolyte interface. Increasing the amount of $GeS_2$ leads to increased capacity and improved cycle retention of the cell.

FIG. 2 part (C) illustrates that incorporation of elemental sulfur at various concentrations can affect the cycling stability and first cyclic coulombic efficiency. The cell with 1% added sulfur shows the best performance and when the amount of sulfur was increased beyond 1%, a decline in first cycle coulombic effect and no improvement in cycling behavior was observed.

FIGS. 3(A) and 3(B) illustrate initial charge-discharge voltage profiles (4.3 V to about 2.5 V) of cells using multi-layer electrolyte 106 with ABM $Li_{4-x}Ge_{1-x}P_xS_4$ electrolyte material (FIG. 3(A)) and heat treated (1° C. min$^{-1}$, 360° C. for 2 hrs) $Li_{4-x}Ge_{1-x}P_xS_4$ material (FIG. 3(B)). As illustrated, initial discharge capacity considerably increased by using heat treated $Li_{4-x}Ge_{1-x}P_xS_4$ material.

FIG. 4 illustrates the cyclic performances of cells using multi-layer layer material with ABM $Li_{4-x}Ge_{1-x}P_xS_4$ material and $Li_{4-x}Ge_{1-x}P_xS_4$ material heat treated (10° C. min⁻, 360° C. for 2 hrs) with cutoff voltages of 4.3 V and 2.5 V. As illustrated, use of heat treated $Li_{4-x}Ge_{1-x}P_xS_4$ material resulted in larger cell capacity and better stability compared to use of ABM $Li_{4-x}Ge_{1-x}P_xS_4$ material.

FIG. 5 illustrates cycle performance using cutoff voltages of 4.3V and 3.3V of cells including heat-treated $Li_{4-x}Ge_{1-x}P_xS_4$ material with various chemical compositions used in $LiCoO_2/Li_{4-x}Ge_{1-x}P_xS_4/77.5$ $Li_2S$-$22.5P_2S_5$/Li cells. As illustrated, multi-layer layered electrolyte with heat-treated $Li_{4-\chi}Ge_{1-\chi}P_\chi S_4$ ($\chi$=85%) material showed the largest discharge capacities.

The capacity of the cells illustrated in FIG. 5 exhibit capacity fade as a function of cycle number, which is thought to be a result of an undesirable reaction(s) between layer 110 material and cathode electroactive material in the cathode. This is thought to be due to the potential differences between the oxide based cathode and the sulfide based electrolyte material. As noted above, to reduce the unwanted side reactions, the electroactive material may be coated with material, such as a metal oxide, as a means of stabilizing the potential difference by using materials which have similar chemical potentials with the cathode materials as coating substances.

FIGS. 6(A) and 6(B) illustrate initial galvanostatic charge (FIG. 6(A)) and discharge (FIG. 6(B)) voltage profiles (4.3V~3.3V) of cells using uncoated $LiCoO_2$ and ALD coated $LiCoO_2$ with various thickness of $Al_2O_3$. $LiCoO_2$ particles were coated with $Al_2O_3$ with various thicknesses (2, 4, and 10 atomic layers). Heat treated (10° C. min⁻¹, 360° C. for 2 hrs) $Li_{4-x}Ge_{1-x}P_xS_4$ (x mol %) material with x=85% and 77.5 $Li_2S$-$22.5P_2S_5$ (mol %) material were used for multi-layer electrolyte 106. As illustrated, discharge capacity decreases as the thickness of $Al_2O_3$ layer increases.

Cyclic performances of cells using uncoated $LiCoO_2$ and ALD coated $LiCoO_2$ with various thicknesses of the $Al_2O_3$ layer are illustrated in FIGS. 7(A) and 7(B). Cells including cathode electroactive material with 2 and 4 layers ALD aluminum oxide as cathode material showed improved stability compared with cells using uncoated $LiCoO_2$ particles as cathode electroactive material. The initial discharge capacity was smaller for cells with 2 and 4 layers coated material over $LiCoO_2$ than cells using uncoated $LiCoO_2$ particles, which is thought to be due to the insulating property of $Al_2O_3$ layers. However, capacity loss during cycles was suppressed by using 2 and 4 ALD layers of aluminum oxide coated onto $LiCoO_2$ particles. As a result, larger capacity from cells using 2 and 4 ALD aluminum oxide coated $LiCoO_2$ after the 5th cycle was obtained, compared to cells using uncoated $LiCoO_2$. On the other hand, cells using 10 layers of ALD aluminum oxide showed poor performance.

FIGS. 8(A) and 8(B) illustrate a comparison between discharge voltage profiles for the 1st cycle and the 12th cycle of cells with uncoated $LiCoO_2$ particles and cells with LiCoO2 coated with 2 layers ALD aluminum oxide. In the illustrated example, there was reduced discharge capacity fade during 12 cycles in cells with coated $LiCoO_2$ particles compared to that in cells with uncoated $LiCoO_2$. The ALD coating of $LiCoO_2$ particles for cathode material effectively reduced the discharge capacity fade of the cells.

Heat treating the coating on the electroactive cathode material is thought to improve the conductivity of the coating. FIG. 9 illustrates cycle performance of heat-treated $LiCoO_2$ coated with 4 atomic layers of aluminum oxide deposited using ALD and FIG. 10 illustrates initial discharge capacity for cells formed using ALD aluminum oxide coated $LiCoO_2$ particles, which were heat-treated in an argon environment. FIGS. 9 and 10 illustrate improved cell performance as a result of the heat treatment of the cathode electroactive material coating.

The present invention has been described above with reference to a number of exemplary embodiments and examples. It should be appreciated that the particular embodiments shown and described herein are illustrative of the preferred embodiments of the invention and its best mode, and are not intended to limit the scope of the invention as set forth in the claims. It will be recognized that changes and modifications may be made to the embodiments described herein without departing from the scope of the present invention. These and other changes or modifications are intended to be included within the scope of the present invention, as expressed in the following claims and the legal equivalents thereof.

The invention claimed is:

1. A solid-state electrochemical cell based on lithium ion transport, the cell comprising:
  an anode;
  a cathode comprising cathode active material particles coated with 1 to 5 conformal atomic layers of metal oxide coating material, the metal oxide coating material comprising at least one of aluminum oxide, zirconium oxide, and titanium oxide;
  and
  a solid-state electrolyte interposed between and in contact with the anode and cathode,
  wherein the solid-state electrolyte comprises: a first electrolyte layer in contact with the anode and that comprises lithium phosphosulfide with no group 14 element; and
  a second electrolyte layer in contact with the cathode and that comprises lithium phosphosulfide with a group 14 element.

2. The solid-state electrochemical cell of claim 1, wherein the anode material comprises a material selected from the group consisting of lithium metal, indium metal, silicon composite material, silicon alloys, carbon, and combination of these materials.

3. The solid-state electrochemical cell of claim 1, wherein the cathode active material particles comprise lithium and oxygen, and further comprise at least one of i) cobalt ii) nickel, cobalt and aluminum; iii) nickel, manganese and cobalt iv) iron and phosphorous; or v) titanium.

4. The solid-state electrochemical cell of claim 1, wherein the cathode active material particles have an average particle size ranging from about 0.01 µm to about 20 µm.

5. The solid-state electrochemical cell of claim 1, wherein the first electrolyte layer comprises $xLi_2S(1-x)P_2S_5$, where x is a molar ratio and ranges from about 60 to about 80.

6. The solid-state electrochemical cell of claim 1, wherein the first electrolyte layer comprises particles with size of about 0.5 to about 20 µm.

7. The solid-state electrochemical cell of claim 1, wherein the second electrolyte layer comprises particles with a size of about 0.5 to about 20 µm.

8. The solid-state electrochemical cell of claim 1, wherein the second electrolyte layer comprises $Li_xGe_yP_zS_4$, where x, y, z are mole concentrations and range from 2.3<x<4, 0<y<1, and 0<z<1.

* * * * *